(No Model.) 2 Sheets—Sheet 1.

A. L. DE VIRLOY, E. COMMELIN & G. BAILHACHE.
SECONDARY BATTERY.

No. 345,124. Patented July 6, 1886.

Witnesses
William Miller
W. Faber du Faur

Inventors
A. L. de Virloy
E. Commelin
G. Bailhache
by Van Santvoord & Hauff
their attys (No Model.) 2 Sheets—Sheet 2.

A. L. DE VIRLOY, E. COMMELIN & G. BAILHACHE.
SECONDARY BATTERY.

No. 345,124. Patented July 6, 1886.

UNITED STATES PATENT OFFICE.

ALEXANDRE LEBRUN DE VIRLOY, EDMOND COMMELIN, AND GABRIEL BAILHACHE, OF PARIS, FRANCE, ASSIGNORS OF ONE-FOURTH TO LEOPOLD DE BOUSIGNAC, OF SAME PLACE.

SECONDARY BATTERY.

SPECIFICATION forming part of Letters Patent No. 345,124, dated July 6, 1886.

Application filed March 27, 1885. Serial No. 160,378. (No model.) Patented in France October 8, 1884, No. 164,681.

*To all whom it may concern:*

Be it known that we, ALEXANDRE LEBRUN DE VIRLOY, EDMOND COMMELIN, and GABRIEL BAILHACHE, citizens of France, and residing at Paris, in the Republic of France, electrical engineers, have invented new and useful Improvements in Secondary Batteries, (for which we have received Letters Patent in France, No. 164,681, dated October 8, 1884;) and we do hereby declare that the following is a full, clear, and exact description of the invention, which will enable others skilled in the art to which it appertains to make and use the same.

The present invention relates to that class of secondary batteries which work as accumulators of electricity, and have in view the collecting, in the form of chemical actions, the electrical energy supplied to them from some exterior source in order to restore such energy afterward in the form of electric currents by virtue of inverse chemical actions.

The invention consists in an accumulator of electricity of the type specified, in which the exciting-liquid is a mixture of water, zincate of potash or soda, with sulphate of potash or soda, the negative pole being copper plates with large surfaces wrapped in wire-gauze of the same metal, so as to be proof against the exciting-liquid, while the positive pole is a hydrate-of-copper wrapping on carbon plates, as will be hereinafter more fully described, and then set forth in the claims.

Figure 1:
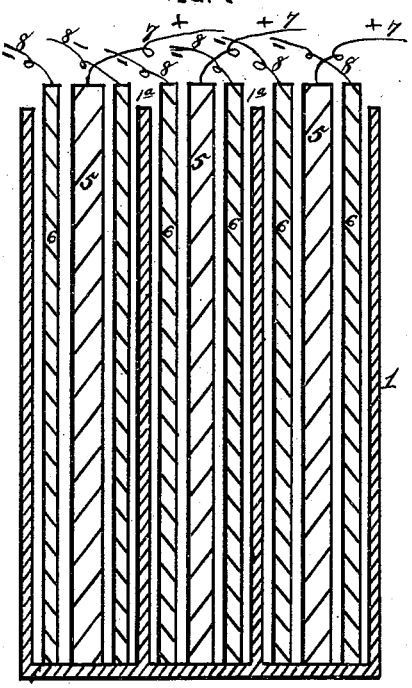
Figure 2:
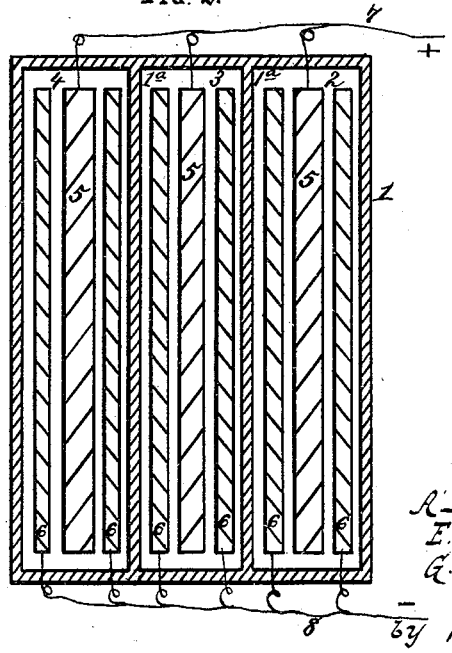

In the accompanying drawings, Figure 1 is a vertical sectional view of our secondary battery or accumulator. Fig. 2 is a plan view of the same.

Referring to the drawings, the reference-numeral 1 designates a vessel of rectangular or other suitable form in wood, cork, or other material, lined with gutta-percha or other material proof against alkalies, the said vessel being divided by partitions $1^a$ into three liquid-proof compartments, 2 3 4.

The numerals 5 represent three very thin carbon plates, each separately covered with a layer of a mixture of metallurgic or gas-coke or retort-coal pulverized, or plumbago with hydrate of oxide of copper or anhydrous oxide of copper, or hydrate of oxide of nickel or anhydrous oxide of nickel, or other metallic oxides, which are insoluble in a solution of potash or of soda, the said layer being protected by a hempen cloth, this constituting the positive pole, and each carbon plate being placed in the center of each compartment.

Figure 3:
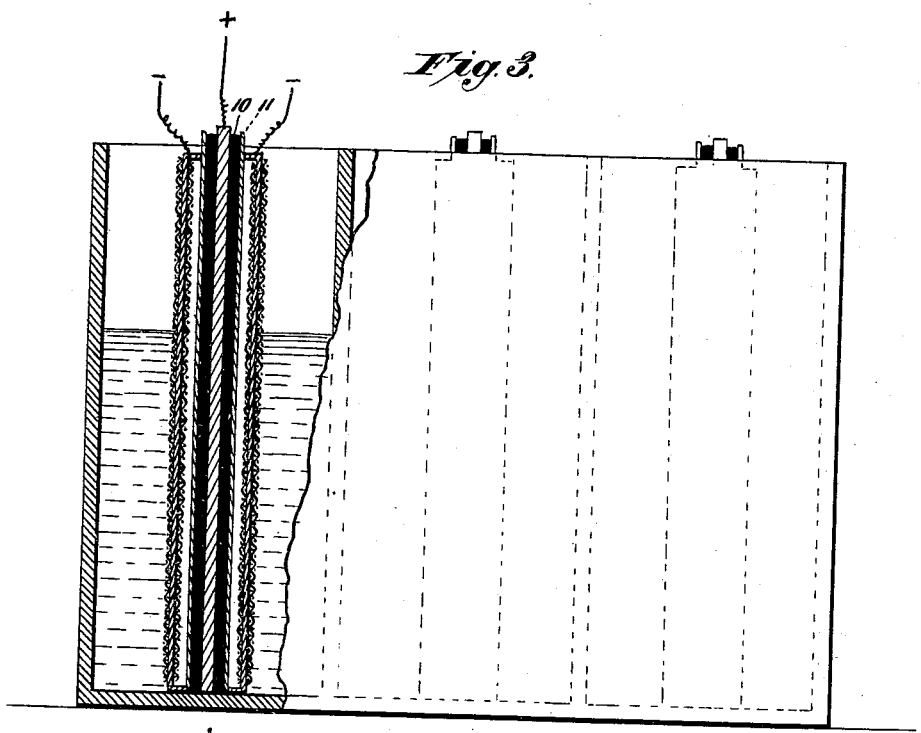
Figure 4:
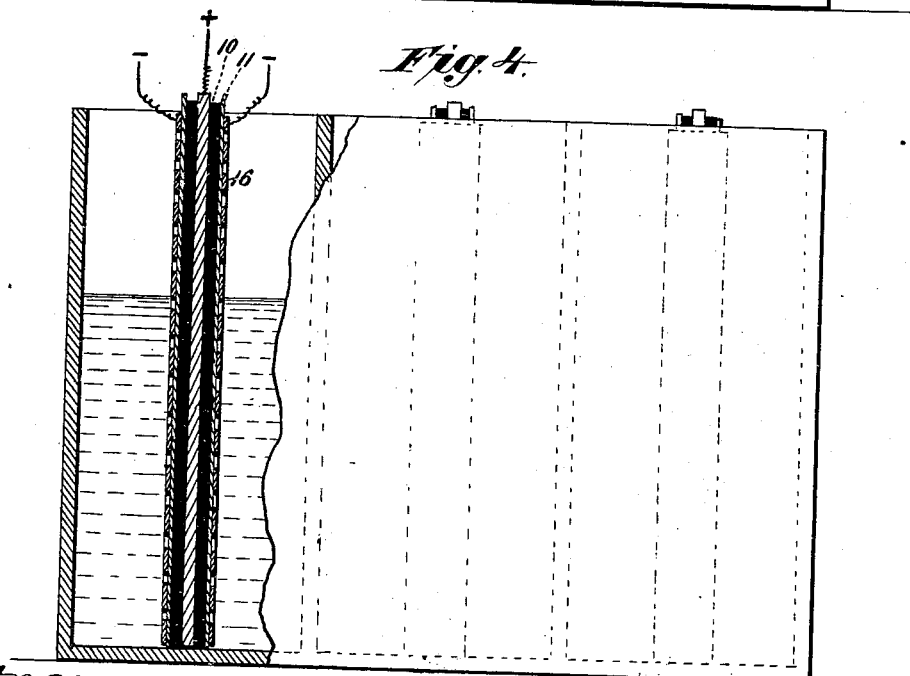

In Figs. 3 and 4 the carbon and metal oxide coating of the carbon plate is designated by the numeral 10, and the hempen cloth covering by the numeral 11.

The numerals 6 represent six thin copper plates wrapped with copper wire-gauze and folded in the form of a very shallow box, or of six perforated copper plates, two of these plates or boxes constituting the negative pole, being placed in each compartment, one on each side of the carbon.

In Fig. 3 are shown the copper plates covered with copper wire-gauze 14, and in Fig. 4 copper plates 16 are shown.

A concentrated solution of zincate of potash or soda containing a sulphate of soda or potash with an excess of potash or soda is placed in the vessel 1, and forms the exciting-fluid.

The dimensions of the vessels and compartments, and the quantity of zincate of soda or potash and of the metallic oxide vary according to the application for which the accumulator is destined and the time in which the apparatus is to be used. However, the quantity of zinc in the solution must be almost equivalent to the quantity of the metal of the oxide employed at the positive pole. The accumulator being thus arranged, the poles are connected either in tension or in quantity with wires 7 and 8, so as to charge them by machines or by piles in one or the other case, according to the effects to be obtained. The discharge is effected either by tension or quantity, according to the end in view. This double arrangement is obtained by means of one of the commutators employed in such cases.

When the positive pole of the accumulator is connected with the positive pole of a magneto or dynamo electric machine, and its negative pole with the negative pole of such machine, the following takes place. At the first charge no effect is produced on the positive pole unless it is that the oxide employed may be susceptible of peroxidation; but on the negative metallic zinc resulting from the decomposition of alkaline zincate is deposited. This zinc in a spongy or porous state will be deposited on the plate or gauze of copper, and this will go on until the solution is exhausted (a point to which there is no need practically to attain.) The accumulator is thus charged to the maximum degree, which may be ascertained by the difference of degree registered by Baumé's aerometer, the solution having lost density in proportion to the zinc deposited.

In employing the stored electricity to produce a certain result—to work, for instance, one of Siemens's machines—the following result is obtained. The potash or the soda set at liberty eats into the zinc and reforms alkaline zincate. The hydrogen resulting from this reaction acts upon the hydrate of oxide of copper or other metal, and reduces it to a diminished degree of oxidation, or even to a metallic state, as is the case with copper, so that if care be taken to employ a quantity of oxide equivalent to the zinc contained in the solution of the alkaline zincate the accumulator will be depolarized to the last atom of zinc.

In the following operations the copper or the other metal or the inferior oxide will be reoxidized again, while the zinc in the reconstituted zincate of potash or soda will be redeposited at the negative pole; and these alternations of oxidizations and reductions will be repeated almost indefinitely without its being necessary to touch the accumulators.

It will now be easy to understand that this new accumulator gives a continuous and uniform discharge, since complete depolarization is obtained. What proves it, moreover, is that during the discharge no gas is seen to escape, (except, however, the first time it is used with an oxide incapable of absorbing more oxygen) at the positive pole. The entire force obtained is thus utilized, which is not the case with the secondary piles in which lead is used, as the latter set at liberty a considerable quantity of gas when they are charged.

The accumulators of twenty-five centimeters long by thirty centimeters high, which can work with a closed current for twenty-four hours, weigh about fifteen kilograms. Forty of this size would therefore be amply sufficient for the traction of a tramway. This would give a total weight of about six hundred kilograms, instead of two thousand four hundred kilograms when Fauré's accumulators are used.

All oxides soluble in potash or soda may be employed, instead of zincate of soda or potash.

We are aware that gauze supports for the active agent in secondary batteries were used by Keichhof as early as 1862, and hence we make no claim thereto, except in connection with the copper plates presenting large surfaces, the gauze supports being themselves of copper.

Having fully described our invention, what we desire to claim and secure by Letters Patent is—

1. In a secondary or storage battery, the combination of an exciting-liquid, consisting of a mixture of zincate of potash or soda with sulphate of potash or soda, the whole in aqueous solution, a negative pole consisting of copper plates with large surfaces, and a positive pole consisting of carbon plates having a metallic oxide wrapping insoluble in the exciting-liquid, substantially as herein set forth.

2. In a secondary or storage battery, the combination of an exciting-liquid consisting of a mixture of zincate of potash or soda with sulphate of potash or soda, the whole in aqueous solution, a negative pole consisting of copper plates with large surfaces and a wrapping of copper wire-gauze, and a positive pole consisting of carbon plates having a hydrate of copper oxide wrapping, substantially as described.

3. In a secondary or storage battery, a negative pole or electrode consisting of copper plates with large surfaces, and a wrapping of copper wire-gauze applied to said plates, in combination with the jar, exciting-fluid, and positive pole, substantially as described.

A. LEBRUN DE VIRLOY.
          ED. COMMELIN.
          G. BAILHACHE.

Witnesses:
  H. BONNEVILLE,
  G. LOMBARD.